US008230759B2

(12) United States Patent
Hsieh

(10) Patent No.: US 8,230,759 B2
(45) Date of Patent: Jul. 31, 2012

(54) INTEGRATED BRAKE AND CHAIN DISK ASSEMBLY FOR DOOR OPERATOR

(76) Inventor: Chung Hsien Hsieh, Taipei Hsien (TW)

( * ) Notice: Subject to any disclaimer, the term of this patent is extended or adjusted under 35 U.S.C. 154(b) by 624 days.

(21) Appl. No.: 12/315,478

(22) Filed: Dec. 3, 2008

(65) Prior Publication Data

US 2010/0132505 A1 Jun. 3, 2010

(51) Int. Cl.
*F16K 31/05* (2006.01)

(52) U.S. Cl. ................ 74/625; 160/9; 160/310; 49/140; 192/226

(58) Field of Classification Search ................ 74/63, 89, 74/421 A, 421 R, 89.2, 625; 160/1, 7, 9, 160/188, 189, 310; 49/139, 140, 197, 199, 49/322; 192/12 D, 12 BA, 223.4, 18 B, 14–16
See application file for complete search history.

(56) References Cited

U.S. PATENT DOCUMENTS 2,464,129 A * 3/1949 Goettisheim ............... 192/18 B
3,853,167 A * 12/1974 Wardlaw ....................... 160/133
5,375,643 A * 12/1994 Rude ............................ 160/321
6,055,885 A * 5/2000 Shea ............................... 74/625
6,092,582 A 7/2000 Liu
6,164,428 A * 12/2000 Berman et al. ............. 192/223.4
6,381,903 B1 * 5/2002 Desrochers et al. ............ 49/139
6,685,592 B2 * 2/2004 Fraczek et al. .................. 475/14
6,973,952 B2 * 12/2005 Nien ............................ 160/170
7,055,283 B2 6/2006 Hsieh
7,275,631 B2 * 10/2007 Hsieh ........................... 192/226
7,341,129 B2 3/2008 Hsieh
7,699,144 B2 * 4/2010 Hsieh ........................... 188/157
* cited by examiner

*Primary Examiner* — Michael P Ferguson
*Assistant Examiner* — Eric Chau
(74) *Attorney, Agent, or Firm* — Bucknam and Archer

(57) ABSTRACT

An integrated brake and chain disk device for a door operator includes an electrical motor with a main shaft coupled to a gear box for rolling a rolling door through an output shaft of the gear box; a brake device for braking the main shaft; a chain disk device for manually rotating the main shaft upon power failure; a clutch device which disengages the intermediate shaft from the chain disk device or engages the intermediate shaft with the chain disk device. The brake device includes at least one torsion spring fitting on a fixed hub. The torsion spring tightly fits on the hub and becomes immovable when a force in a spiral direction of the torsion spring is exerted on either end of the torsion spring, and can be released from the hub when a force in a direction opposite to the spiral direction of the torsion spring is exerted on either end of the torsion spring. In this way, the brake device and the chain disk device are integrated.

18 Claims, 6 Drawing Sheets

INTEGRATED BRAKE AND CHAIN DISK ASSEMBLY FOR DOOR OPERATOR

BACKGROUND OF THE INVENTION

1. Field of the invention

This invention relates to an integrated brake and chain disk assembly for a door operator, particularly to an integrated brake and chain disk assembly for a door operator by which a main shaft of the door operator can be braked and rotated by arrangement of a torsion spring.

2. Brief Description of the Prior Art

Generally, the door operator for a fire door or a safety door basically comprises an electric motor with a main shaft coupled to a gear box for rolling a rolling door such as a flexible sheet door, a slat door, a grille door and the like; a brake device having at least one end disk for braking the main shaft; a chain disk device for manually rotating the main shaft upon power failure; and a clutch device for disengagement of the end disk by energizing an electromagnet. Further, the door operator additionally includes a latch device for locking the chain disk in the motor operation mode; and a brake releasing device for releasing the brake device in the manual operation mode. For the manual operation mode, it is well known that the latch device has to be released at first, and then a chain is pulled on one hand while the brake releasing device is operated so as to release the main shaft in other hand.

As to an integrated brake and chain assembly for a door operator, several associated documents have been proposed. For example, U.S. Pat. No. 6,055,885 which was filed by the applicant describes that the chain disk is used for manually rotating the main shaft upon power failure and normally pressed against a clutch device by means of an elastic element so as to brake the main shaft of the door operator. Therefore, a latch device for locking the chain is provided on the housing of the door operator so as to hold the chain disk. Furthermore, U.S. Pat. No. 6,092,582 has a typical operation mode as stated above where a latch device has to be released at first in the manual operation mode, and then the chain is pulled so as to rotate the chain disk and at the same time the brake releasing device has to be operated so as to release the main shaft.

Additionally, the applicant's another U.S. Pat. No. 7,055,283 B2 has been proposed to provide a control system for switching from a manual operation mode into a motor operation mode, comprising a brake device for braking and releasing a main shaft of the door operator; a chain disk device pivoted uncoaxially; a clutch device disposed between the main shaft and the chain disk device for allowance of rotation in single direction; a driven disk interlocked with the clutch device for switching a protection device. As long as the chain is pulled, the circuit of the door operator is cut off and the braking device is released so that the operation mode is automatically switched into a safe manual operation mode.

The person skilled in the art understands that the above documents still need to be improved when put into practical.

SUMMARY OF THE INVENTION

The main object of the present invention is to provide an integrated brake and chain disk assembly for a door operator which is simplified in comparison with the prior-art.

In order to achieve the above and other objects, the integrated brake and chain disk assembly for a door operator according to the present invention is provided in which a main shaft of the door operator can be braked or manually rotated upon power failure. The door operator is provided with a first hub and a second hub on its housing and comprises:

an intermediate shaft which extends through the first hub and the second hub and is coupled to the main shaft;

a brake device having an end disk fixed on the intermediate shaft, at least one torsion spring with two free ends fitting on the first hub, when a force in a spiral direction of the torsion spring is exerted on either end of the torsion spring, the torsion spring tightly fits on the first hub and becomes immovable so that the main shaft is braked, and when a torsion force in a direction opposite to the spiral direction of the torsion spring is exerted on either end of the torsion spring, the torsion spring is loosened and released from the first hub;

a clutch device having an axially movable sleeve interposed between the intermediate shaft and the second hub, a driven disk with a lining facing to the end disk being disposed on one end of the sleeve and biased toward the end disk for braking the main shaft, and an electromagnet device which is disposed on the second hub and retracts the driven disk so as to release the main shaft when being energized;

a chain disk device comprising a manual switch device composed of a central disk fixed on the other end of the sleeve and an outer ring portion, a blocking plate axially projecting from the central disk for abutting on the ends of the torsion spring in the spiral direction of the torsion spring, a chain disk pivotally provided outside the central disk and a chain which is looped around the chain disk, the outer ring portion being fixed on the chain disk, a push plate projecting from outer portion for abutting on the ends of the torsion spring in the direction opposite to the spiral direction of the torsion spring; and a circuit by which the door operator and the electromagnet device are energized simultaneously.

According to the invention, the operation of the brake device causes the torsion spring to be twisted while the operation of the chain disk causes the torsion spring to be detwisted. The operation of the brake device and the operation of the chain disk would not interfere with each other so that the door operator can be reliably operated.

According to the present invention, the chain disk device is integrated with the brake device so that a mechanism for prevention of the chain disk from rotating together with the main shaft can be eliminated in comparison with prior art.

According to the present invention, in the event of power failure, additional operation to release the brake device is unnecessary when an user intends to roll the door through pulling the chain. Comparing with the prior art, a brake releasing mechanism can be omitted.

According to the present invention, the brake device, the clutch device and the chain disk device are coaxially integrated in a housing unit and function as a manual operation module. This module can be installed at either side of the electric motor for the user's convenience for repairs, replacement, detachment or maintenance.

DETAILED DESCRIPTION OF THE PREFERRED EMBODIMENTS

Figure 1:
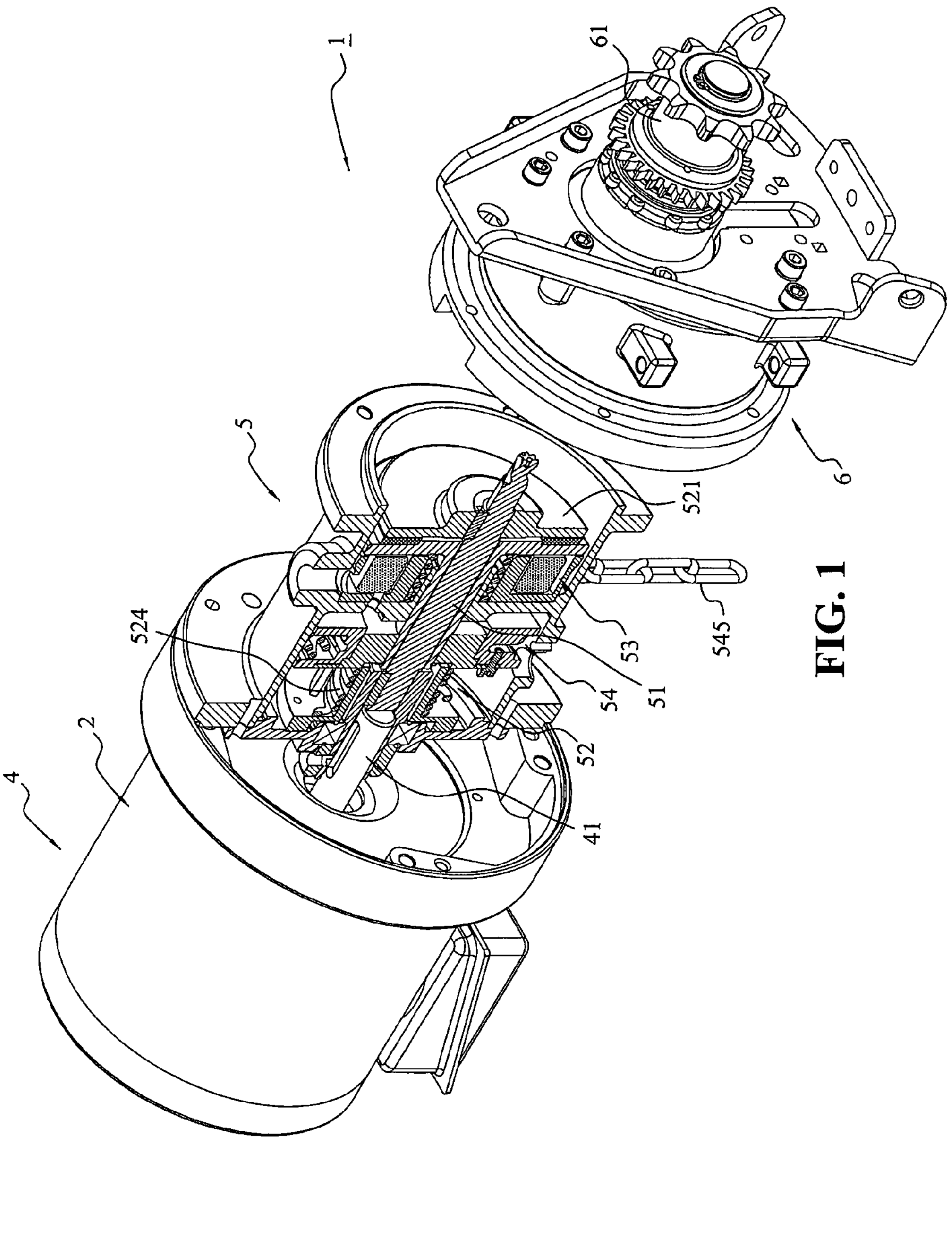
FIG. 1 is a partially exploded perspective view showing the door operator according to the present invention, in which the integrated brake and chain disk assembly is shown in a cross section.

The technical contents of the present invention will become more apparent from the detailed description of the preferred embodiments in conjunction with the accompanying drawings. It is noted that the preferred embodiments are purely for illustrative, not for restrictive purpose.

Firstly referring to FIGS. 1 to 3*b*, in which a door operator 1 according to the present invention is shown. The housing 2 of the door operator 1 is partitioned into several receiving spaces by a plurality of partitioning plates 3*a*, 3*b*, 3*c*. An electric motor 4 is accommodated within one of the spaces and has a main shaft 41 which is operatively coupled to a gear box 6 through an intermediate shaft 51 for driving an output shaft 61 of the gear box 6 and rolling a rolling door (not shown) such as a flexible sheet door, a slat door, a grille door and the like. According to the present invention, the integrated brake and chain disk assembly is used for braking the main shaft 41 on one hand and allows users to manually rotate the main shaft 41 in the event of power failure on the other hand.

The door operator 1 is provided with a first hub 21 and a second hub 22 on the housing 2. The intermediate shaft 51 extends through the first hub 21 and the second hub 22 and is coupled to the main shaft 41.

A brake device 52 comprises an end disk 521 fixed on one end of the intermediate shaft 51. At least one torsion spring 524 (524') with two free ends fits on the first hub 21. When the torsion spring 524 (524') is twisted or the ends thereof are subjected to a force in the spiral direction of the torsion spring (direction a), the torsion spring 524 (524') would tightly fit on the first hub 21 and become immovable. On the contrary, when the torsion spring 524 (524') is de-twisted or the ends thereof are subjected to a force in the direction opposite to the spiral direction of the torsion spring (direction b), the torsion spring 524 (524') would be loosened and released from the first hub 21.

A clutch device 53 has an axially movable sleeve 531 interposed between the intermediate shaft 51 and the second hub 22. A driven disk 532 provided with a lining 533 facing to the end disk is fixed on one end of the sleeve 531 . The driven disk 532 is biased to the end disk 521 for brake the main shaft. An electromagnet device 534 is disposed on the first hub 21. The electromagnet device 534 retracts the driven disk 532 for disengagement of the end disk 521 when the electromagnet device 534 is energized.

A chain disk device 54 comprises a manual switch device 54*a* for accommodating and abutting on the free ends of the torsion spring. The manual switch device 54*a* is composed of a central disk 541 and a outer ring portion 543. The central disk 541 is fixed on the other end of the sleeve 531. A block plate 542 axial projects from the central disk 541 and is arranged to abut on either end of the torsion spring 524 (524') in the spiral direction of the torsion spring 524 (524') (direction a), and thus, with rotation of the central disk 541, the torsion spring 524 (524') is twisted. A chain 545 is looped around a chain disk 540. The chain disk 540 surrounds and is pivoted on the central disk 541 in such a way that it is capable of rotating with respect to the central disk 541. The outer ring portion 543 is fixed on the chain disk 540, and a push plate 544 axially projects from the out ring portion 543 and is arranged to abut on either end of the torsion spring 524 (524') in the direction opposite to the spiral direction of the torsion spring 524 (524') (direction b). With rotation of the chain disk 540, the torsion spring 524 (524') is de-twisted.

Figures 3, 3A, 3B:
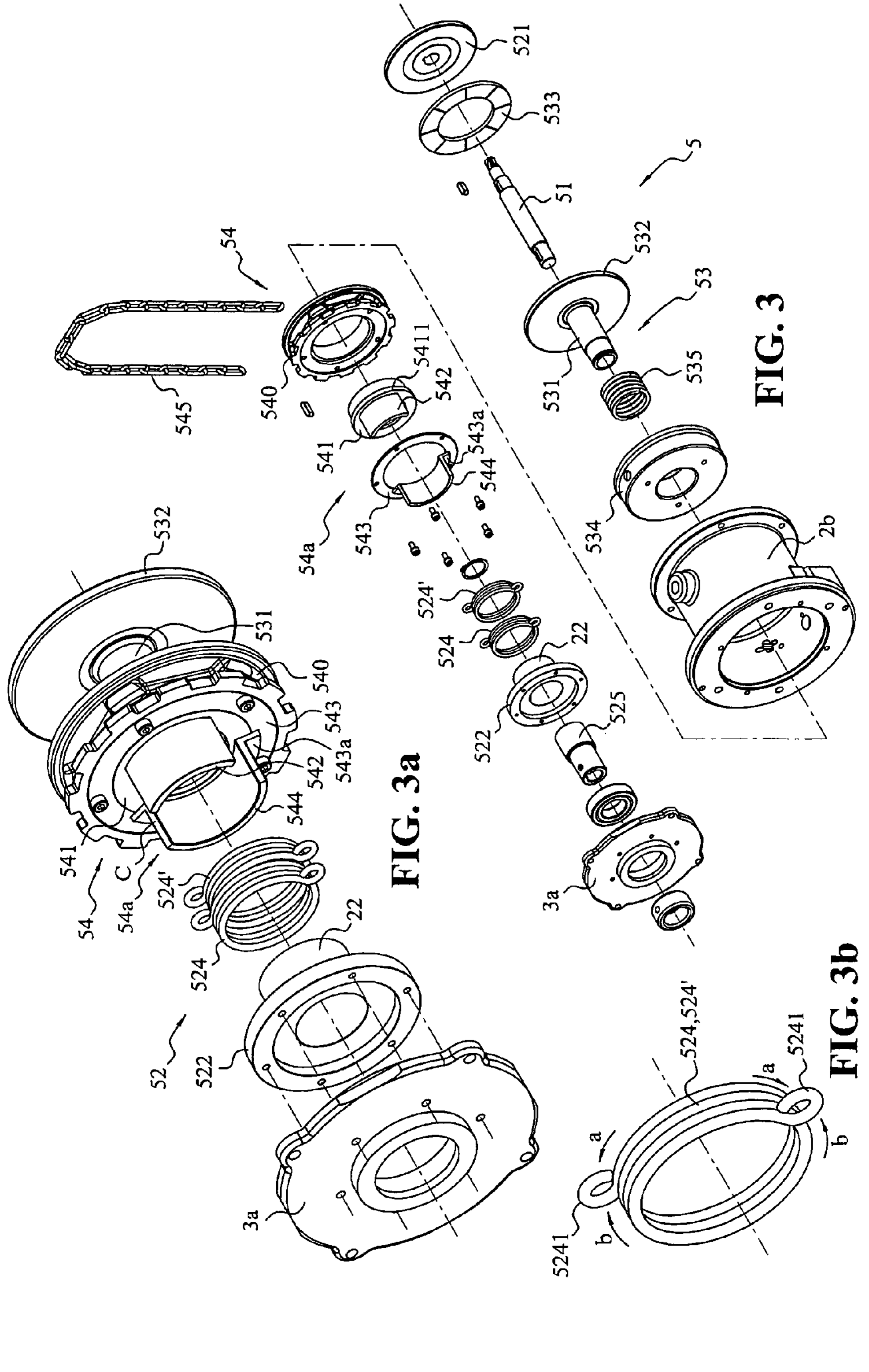
FIG. 3 is an exploded perspective view showing the integrated brake and chain disk assembly of the present invention, in which irrelevant parts are not shown.
FIG. 3*a* is a partial enlarged view of FIG. 3, in which a part of the members is assembled and a part of the members is not shown.
FIG. 3*b* is a perspective view showing the torsion spring of the present invention.
Figure 4A:
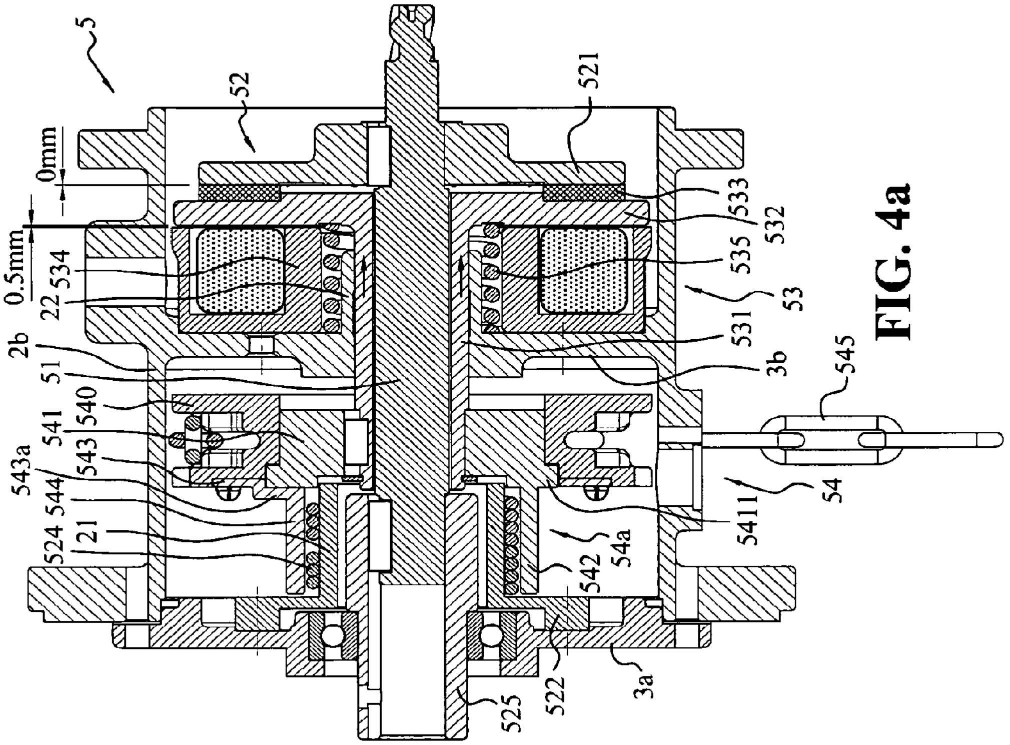
FIG. 4*a* is a sectional schematic view showing the integrated brake and chain disk assembly of the present invention, in which the intermediate shaft is braked through the clutch device.
Figure 4:
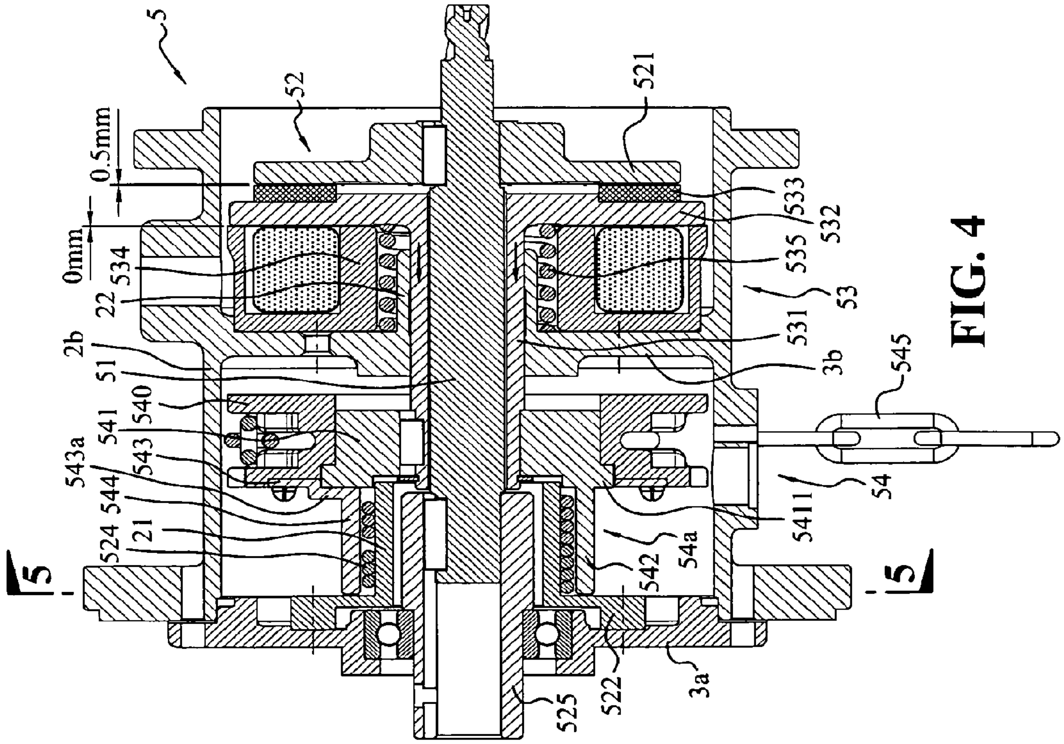
FIG. 4 is a sectional schematic view showing the integrated brake and chain disk assembly of the present invention, in which the intermediate shaft is released by the clutch device.
Figure 5A:
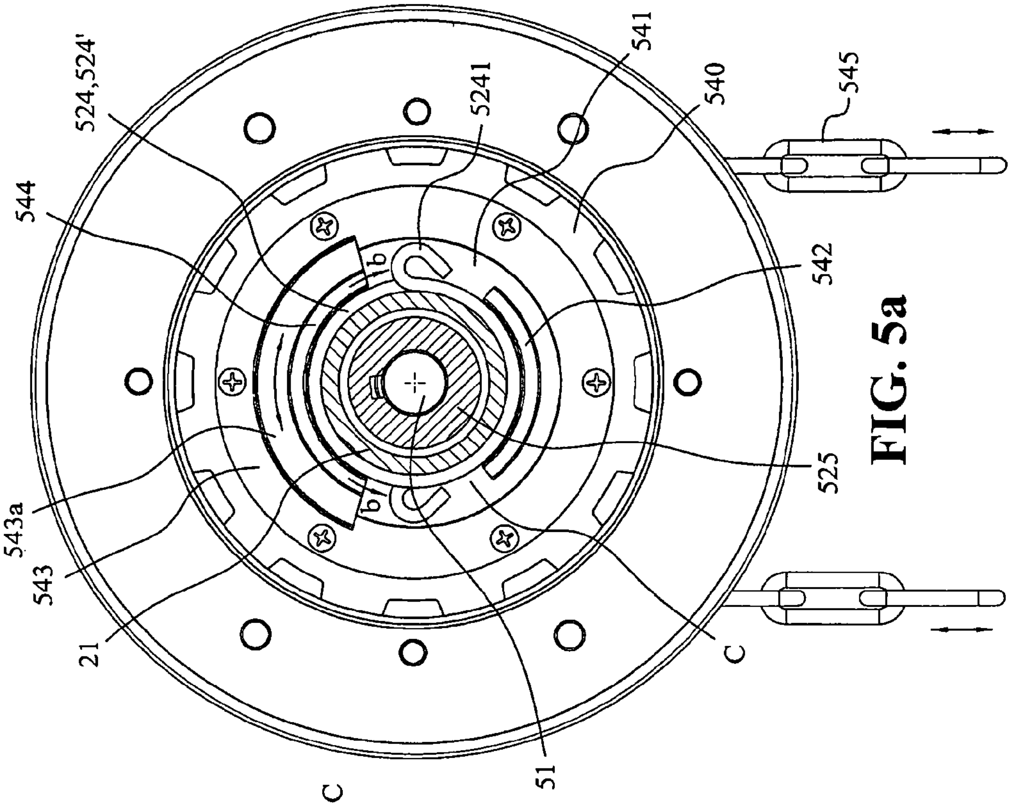
FIG. 5*a* is a schematic view showing that the torsion spring is to be subjected to a force in the direction opposite to the spiral direction of the torsion spring.
Figure 5:
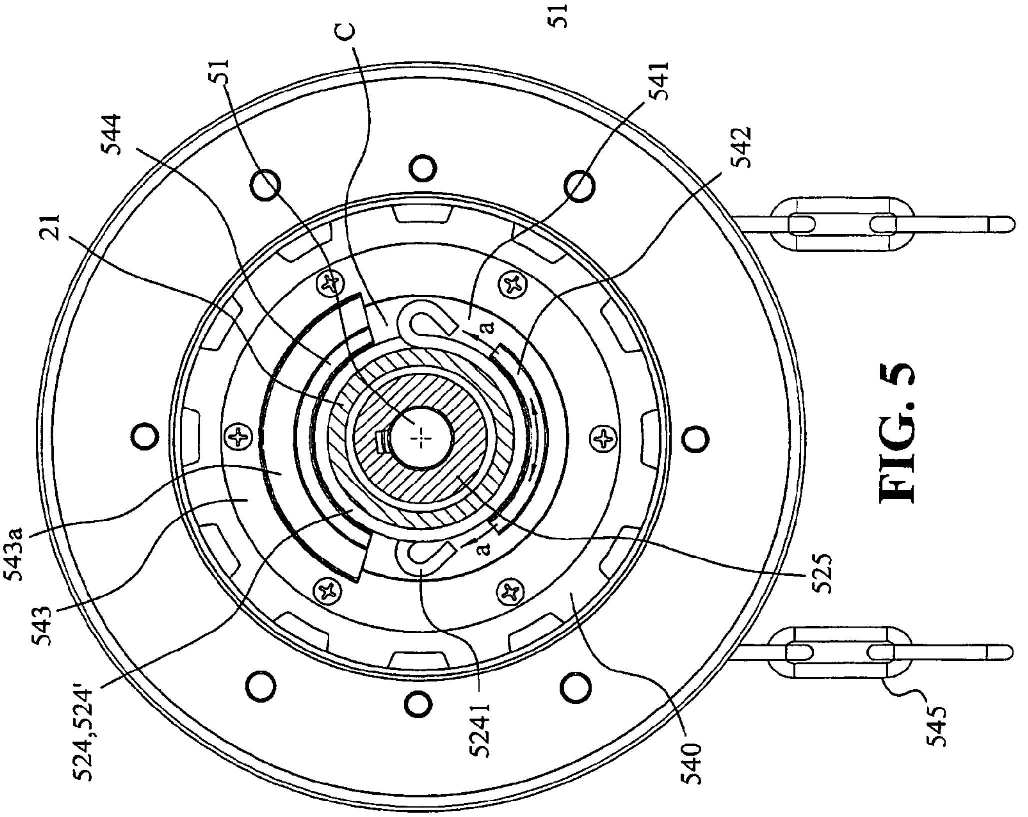
FIG. 5 is a sectional schematic view taken in 5-5 line of FIG. 4, in which the torsion spring is to be subjected to a force in the spiral direction of the torsion spring.

Referring to FIGS. 4 to 5*a* in addition to FIGS. 3 to 3*b* for better understanding of the present invention. FIG. 4 shows that the clutch device releases the intermediate shaft, whereas FIG. 4*a* shows that the clutch device brakes the intermediate shaft. According to the present invention, the central disk 541 is formed with a flange 5411 at the side of the block plate 542. The outer ring portion 543 surrounds the flange 5411 and is radially inwardly formed with a shoulder 543*a* for restricting axial movement of the flange 5411. The push plate 544 is integrally connected on the shoulder 543*a*. The block plate 542 of the central disk 541 and the push plate 544 of the outer ring portion 543 are coaxially arranged opposite to each other by the same radius so that two variable intervals C are formed circumferentially between the block plate 542 and the push plate 544.

The block plate 542 and the push plate 544 both extends into the range of the first hub 21, and the free ends of the torsion spring 524 (524') are accommodated in the intervals (as shown in FIGS. 5 and 5*a*). Preferably, a pair of torsion springs 524 and 524' are provided on the first hub 21. Each free end 5241 of the torsion springs 524 and 524' is formed into a loop which is opened to the block plate 542 of the central disk 541.

Figure 2:
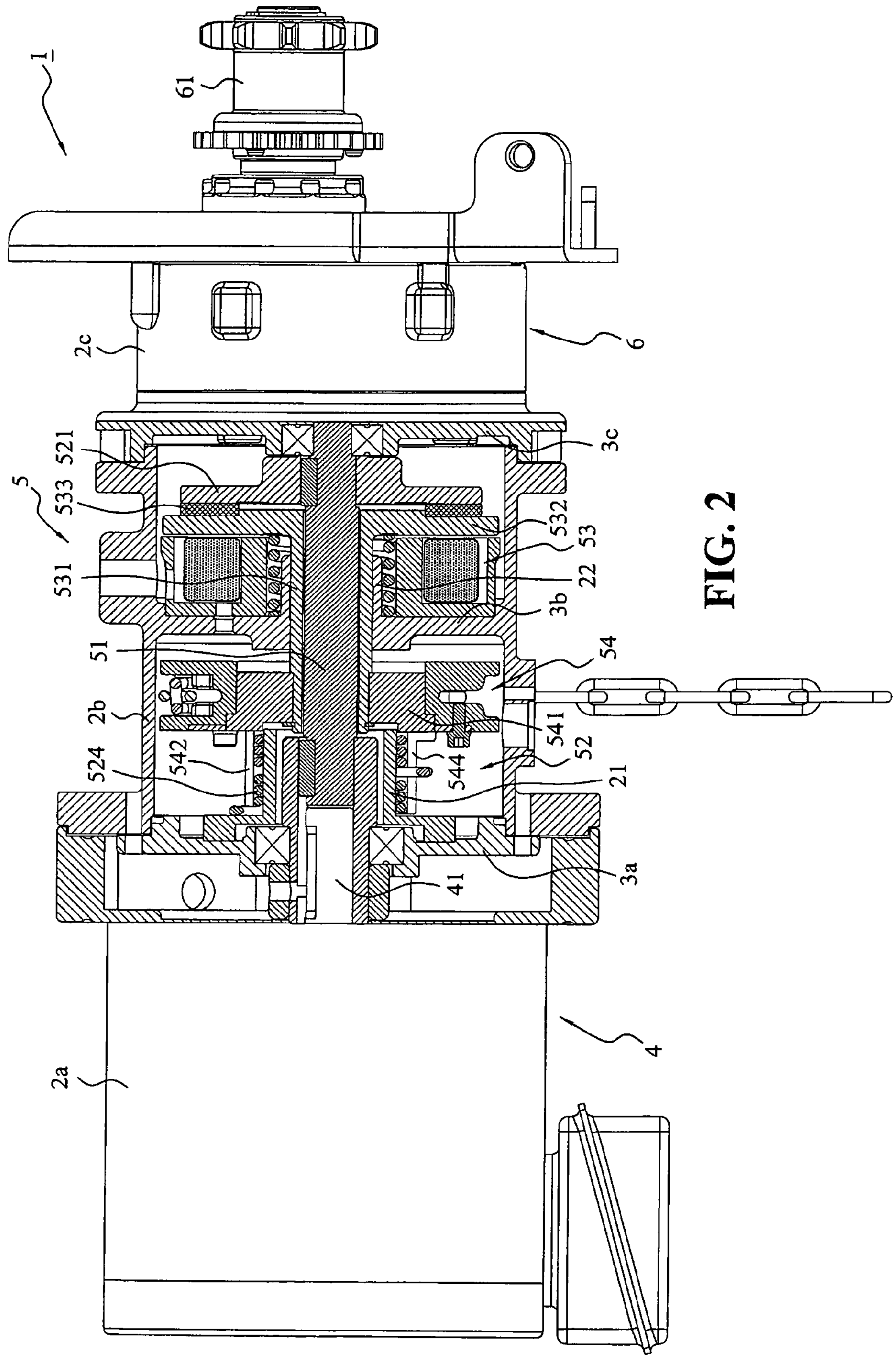
FIG. 2 is a partially sectional schematic view showing the door operator of FIG. 1.

According to the present invention, a partitioning plate 3*a* is interposed between the electric motor 4 and the chain disk device 54. A fixing disk 522 integrally formed on the base end of the first hub 21 is fixed on the partitioning plate 3*a*. Another partitioning plate 3*b* is interposed between the chain disk device 54 and the clutch device 53, and the second hub 22 is integrally formed on the partitioning plate 3*b* at the center. The electromagnet device 534 is held on the partitioning plate 3*b*. The electromagnet device 534 which is hollow is fitted on the second hub 22, and a receiving space is formed between the second hub 22 and the electromagnet device 534. An elastic element 535 is accommodated in the receiving space, one end of which is pressed against the partitioning plate 3*b* and the other end against the driven disk 532. In this way, the driven disk 532 with the lining 533 is biased to the end disk 521 by the elastic element 535. Further, the housing 2 of the door operator 1 comprises a first housing unit 2*a*, a second housing unit 2*b* and a third housing unit 2*c* for accommodating components such as the electric motor 4 and the gear box 6. The brake device 52, the clutch device 53 and the chain disk device 54 are coaxially integrated in the second housing unit 2*b* and function as a manual operation module 5 between the electric motor 4 and the gear box 6. A coupler 525 couples the intermediate shaft 51 of the manual operation module 5 with the main shaft 41 of the electric motor 4 so that the manual operation module 5 is detachably mounted to the door operator (as shown in FIGS. 1 and 2).

According to the present invention, a control circuit is provided to energize the door operator and the electromagnet device 534 simultaneously so as to retract the driven disk 532 and disengage the lining 533 from the end disk during the operation of the electrical motor (as shown in FIG. 4). On the contrary, in the event of power failure, the electromagnet device 534 is unworking, and the driven disk 532 is pressed against the end disk 521 by the elastic element 535 (as shown in FIG. 4*a*). Although the main shaft 41 of the door operator 1 has a tendency to rotate due to the weight of the rolling door, the block plate 542 on the central disk 541 fixed on the other end of the sleeve 531 would abut on and be stopped by the ends 5241 of the torsion springs 524 and 524' in the spiral direction of the torsion springs 524 and 524', and hence the main shaft 41 is stopped rotating and braked (as shown in FIG. 5). On the other hand, in the event of power failure, the chain 545 may be pulled manually to rotate the chain disk 540. As the push plate 544 fixed on the end face of the chain disk 540 abuts on the ends of the torsion springs 524 and 524' in the direction opposite to the spiral direction of the torsion springs 524 and 524', the torsion springs 524 and 524' are loosened and released from the first hub 21 (as shown in FIG. 5*a*) so that the block plate is urged circumferentially by the push plate and the intermediate shaft51, the output shaft 61 of the gear box 6 are rotated, and consequently the rolling door is rolled.

Figure 6:
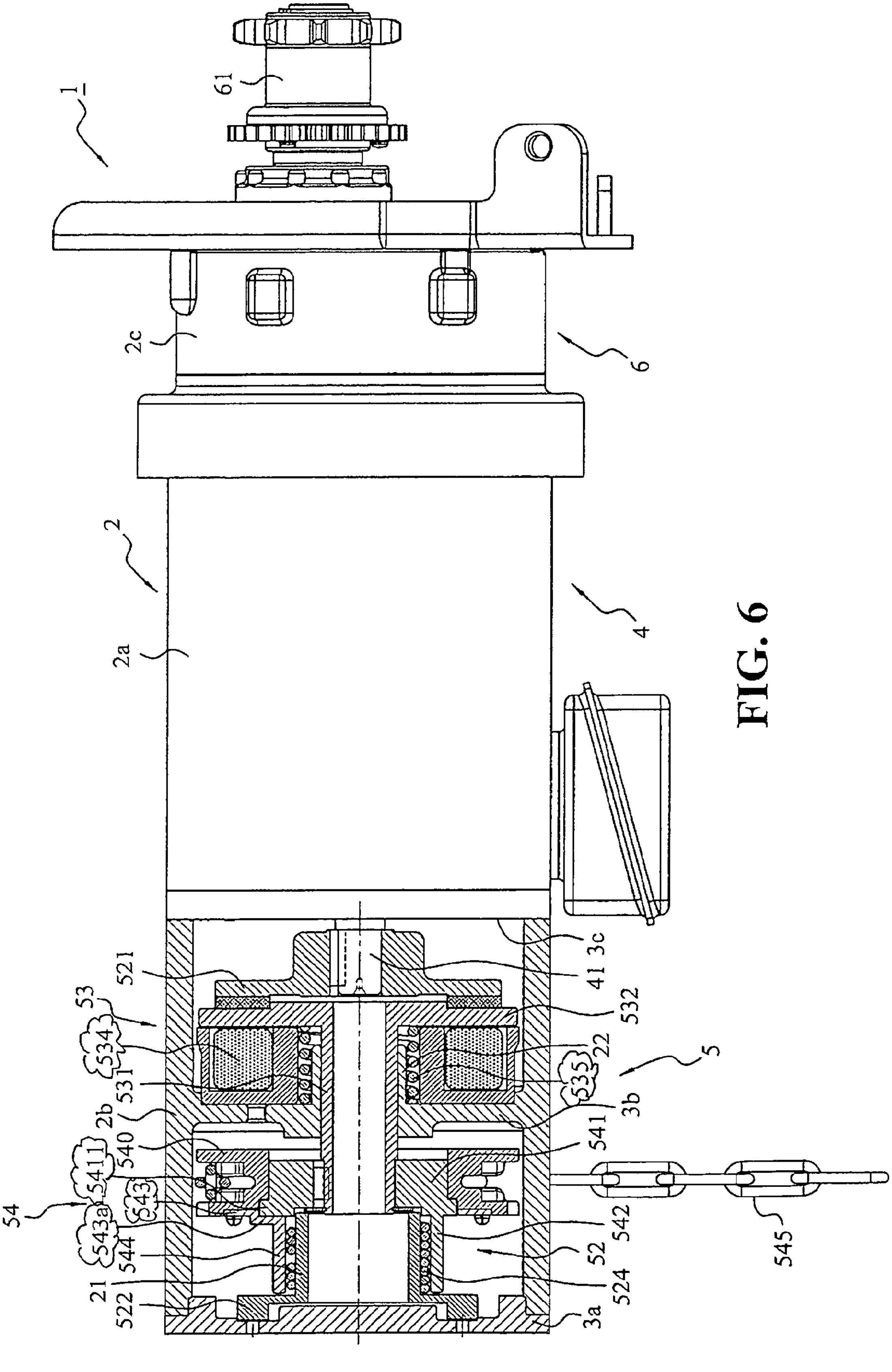
FIG. 6 is a partially sectional schematic view showing another embodiment of the integrated brake and chain disk assembly of the present invention.

FIG. 6 shows another embodiment of the present invention. According to the present invention, the door operator 1 comprises: a housing 2; an electric motor 4 which is received in the housing 2 and has a main shaft coupled to a gear box 41 for rolling a rolling door through an output shaft 61 of the gear box 41.

An integrated brake and chain disk assembly 5 is disposed on one end of the main shaft 41 and comprises: a brake device 52 for braking the main shaft 41; a chain disk device 54 for manually rotating the main shaft 41 so as to roll the rolling door; and a clutch device 53 which disengages the main shaft 41 from the chain disk device 54 when the clutch device 53 is energized and engages the main shaft 41 with the chain disk device 54 when the clutch device 53 is not energized. The clutch device 53 comprises an axially movable sleeve 531 which is supported by the second hub 22 fixed on the housing 2. The brake device 52 has at least one torsion spring 524 with two free ends for which fits on a first hub 21 fixed on the housing. The chain disk device 54 has a manual switch unit 54*a* for accommodating and abutting on the free ends of the torsion spring 524. When a force in a spiral direction of the torsion spring is exerted on either end of the torsion spring 524 by the manual switch unit 54*a*, the torsion spring 524 tightly fits on the first hub 21 and becomes immovable, and the sleeve 531 is blocked and the main shaft 41 is braked. When a force in a direction opposite the spiral direction of the torsion spring 524 is exerted on either end of the torsion spring by the manual switch unit 54*a*, the torsion spring 524 is loosened and released from the first hub 21, whereby the sleeve 531 and hence the main shaft 41 can be rotated manually.

According to this embodiment of the integrated brake and chain disk assembly, the configuration is basically similar to the former embodiment, and the description thereof may be omitted. The difference of this embodiment from the former one is in that the manual operation module 5 is disposed at the opposite side of the gear box 6 and the electric motor 4 is positioned between the gear box 6 and the manual operation module 5. The manual operation module 5 can be detachably mounted to the electric motor 4. The end disk 521 is directly fixed on the end of the main shaft 41 of the electric motor 4. In comparison with the manual operation module 5 of the former embodiment, the intermediate shaft and the coupler can be omitted.

Summing up, through skillful arrangement of the torsion spring, the push plate on the chain disk and the block plate on the central disk, the block plate abuts on the ends of the torsion spring in the spiral direction of the torsion spring so that the block plate is blocked and hence the main shaft is braked while the push plate abuts on the ends of the torsion spring in the direction opposite to the spiral direction of the torsion spring so that the push plate urges the block plate and hence the main shaft is rotated. Furthermore, the present invention is advantageous due to the simplified structure and convenience for detachment and maintenance.

While the preferred embodiments have been described as above, it is noted that the preferred embodiments are not restrictive to the scope of implementation of the present invention. Modifications and variations may be made without departing from the scope of the claims of the present invention.

What is claimed is:

1. An integrated brake and chain disk assembly for a door operator, said door operator comprising a housing having a space therein, an electric motor mounted in a left side of the space of said housing with the right end of a main shaft of the electric motor operatively coupled to a gear box to roll a rolling door, wherein said integrated brake and chain disk assembly comprises:

an intermediate shaft disposed within said housing of said door operator, said intermediate shaft having a left end connected to the right end of said main shaft of said electric motor, and a right end coupled to said gear box;

an end disk fixedly mounted to the right side of said intermediate shaft;

a clutch device having a sleeve disposed on said intermediate shaft; a driven disk being disposed on the right end portion of said sleeve to face said end disk; wherein said sleeve is controlled by actuation means to move between a first position in which said driven disk is retracted away from said end disk when said clutch device is energized, and a second position in which said driven disk is actuated to engage said end disk when said clutch device is not energized;

a chain disk device having a chain disk disposed at the left end of said sleeve, said chain disk including a receiving portion at the center and a chain surrounding an outer periphery thereof; a manual switch unit having a central disk and an outer ring portion, wherein the right end of said central disk is fixedly connected to the left end of said sleeve and received within said receiving portion of said chain disk, a block plate projects axially outward from said central disk, said outer ring portion and said chain disk are attached to each other and pivotally mounted on an outer periphery of said central disk, and said outer ring portion has a push plate projecting axially outward therefrom to form a pair of intervals with said block plate axially;

a brake device comprising a first hub and at least one torsion spring, in which the left end of said first hub is fixed to said housing, and the right end thereof projects to locate at the interior of said block plate and said push plate, said at least one torsion spring has an internal diameter and is constricted on an outer periphery of said first hub, and has two free ends, each forming into a loop accommodated in said respective interval;

whereby when either end of said torsion spring is subject to a force applied by said block plate in the twisting direction of said torsion spring, the internal diameter of said torsion spring is reduced further so that said torsion spring tightly fits on said first hub and becomes immovable, thereby inducing a braking effect on said intermediate shaft; and when either end of said torsion spring is subject to a force applied by said manual switch unit in the direction opposite to the twisting direction of said torsion spring, the internal diameter of said torsion spring is restored so that said torsion spring is loosened from said first hub, thereby releasing the braking of said intermediate shaft such that said intermediate shaft is manually rotatable.

2. An integrated brake and chain disk assembly for a door operator as claimed in claim 1, wherein said housing is further provided with a hollow second hub spaced from said first hub, said intermediate shaft passes through said first and second hubs, and said integrated brake and chain disk assembly is arranged to surround an outer periphery of said intermediate shaft.

3. An integrated brake and chain disk assembly for a door operator as claimed in claim 2, wherein said clutch device further comprising an electromagnet device arranged to surround an outer periphery of said second hub, and said driven disk is retracted away from said end disk when said electromagnet device is energized.

4. An integrated brake and chain disk assembly for a door operator as claimed in claim 3, wherein said central disk is provided with a flange on the left end face thereof; the flange is surrounded by the outer ring portion; said outer ring portion is partially provided with a shoulder projecting radially inward and restraining an axial movement of said flange; and said push plate is integrated with said shoulder.

5. An integrated brake and chain disk assembly for a door operator as claimed in claim 4, wherein said block plate of said central disk and said push plate of said outer ring portion are coaxially arranged by the same radius.

6. An integrated brake and chain disk assembly for a door operator as claimed in claim 5, wherein said block plate and said push plate respectively partially surround said first hub.

7. An integrated brake and chain disk assembly for a door operator as claimed in claim 1, wherein said brake device includes two torsion springs, and said either end of the torsion spring is a free end forming into a loop that is operatively engageable with the respective end of said block plate.

8. An integrated brake and chain disk assembly for a door operator as claimed in claim 1, wherein said housing is partitioned into a first housing unit, a second housing unit and a third housing unit by a first partitioning plate and a second partitioning plate to form several receiving spaces for accommodating said electric motor within the first housing unit, and said gear box within the third housing unit; said brake device, said clutch device and said chain disk device are coaxially arranged by said intermediate shaft in said second housing unit and serve as a manual operation module.

9. An integrated brake and chain disk assembly for a door operator as claimed in claim 8, wherein the first partitioning plate is radially interposed between said electric motor and said chain disk device, while a fixing disk formed on end of said first hub is fixed on the first partitioning plate.

10. An integrated brake and chain disk assembly for a door operator as claimed in claim 8, wherein said second housing unit further comprises therein a third partitioning plate which is integral with said second hub; said electromagnet device is arranged to surround the outer periphery of the second hub and attached on said third partitioning plate, wherein a receiving space is formed between said second hub and said electromagnet device for accommodating an elastic element, one end of the elastic element being pressed against said third partitioning plate and the other end of the elastic element being pressed against said driven disk to urge said sleeve to move constantly towards the second position.

11. An integrated brake and chain disk assembly for a door operator as claimed in claim 8, wherein said intermediate shaft of said manual operation module is coupled with the main shaft of said electric motor by means of a coupling.

12. An integrated brake and chain disk assembly for a door operator as claimed in claim 8, wherein said manual operation module is removably installed between said electric motor and said gear box.

13. An integrated brake and chain disk assembly for a door operator, said door operator having a housing partitioned by at least a partition plate into a plurality of spaces therein, and an electric motor mounted in the housing with the right end of a main shaft of the electric motor coupled to a gear box to roll a rolling door, wherein said integrated brake and chain disk assembly comprises:

a second hub having an internal diameter and projecting outwards from the right end surface of the partition plate, a clutch device having an end disk fixedly mounted at the left end of the main shaft, and a sleeve rotatably mounted in the internal diameter of the second hub; and a driven disk is disposed on the right end portion of the sleeve to face the end disk; wherein the sleeve is controlled by actuation means to move between a first position in which the driven disk is retracted away from the end disk when the clutch device is energized, and a second position in which the driven disk is actuated to engage the end disk when the clutch device is not energized;

a chain disk device having a chain disk disposed at the left end of the sleeve, the chain disk including a receiving portion at the center and a chain surrounding the outer periphery thereof; a manual switch unit having a central disk and an outer ring portion, wherein the right end of the central disk is fixedly connected to the left end of the sleeve and received within the receiving portion of the chain disk, a block plate projects axially outward from a left end face of the central disk, the outer ring portion and the chain disk are attached to each other and pivotally mounted on an outer periphery of the central disk, and the outer ring portion has a push plate projecting axially outward therefrom to form a pair of intervals with the block plate axially;

a brake device comprising a first hub and at least one torsion spring, in which the left end of the first hub is fixed to the housing, and the right end thereof projects to locate at the interior of the block plate and the push plate, the at least one torsion spring has an internal diameter and is constricted on the outer periphery of the first hub, and has two free ends, each forming into a loop accommodated in the respective interval;

whereby when either end of the torsion spring is subject to a force applied by the block plate in the twisting direction of the torsion spring, the internal diameter of the torsion spring is reduced further so that the torsion spring tightly fits on the first hub and becomes immovable, thereby inducing a braking effect on the sleeve; and when either end of the torsion spring is subject to a force applied by the manual switch unit in the direction opposite to the twisting direction of the torsion spring, the internal diameter of the torsion spring is restored so that the torsion spring is loosened from the first hub, thereby releasing the braking of the sleeve shaft such that the sleeve is manually rotatable.

14. An integrated brake and chain disk assembly for a door operator as claimed in claim 13, wherein said clutch device further comprises an electromagnet device arranged to surround an outer periphery of said second hub and is attached on said partitioning plate, a receiving space is formed between said second hub and said electromagnet device for accommodating an elastic element, one end of the elastic element being pressed against said partitioning plate and the other end of the elastic element being pressed against said driven disk to urge said sleeve to move constantly towards the second position.

15. An integrated brake and chain disk assembly for a door operator as claimed in claim 14, wherein a radial flange is provided on the left end face of said central disk; the flange is surrounded by the outer ring portion; said outer ring portion is partially provided with a shoulder projecting radially inward and restraining an axial movement of said flange; and said push plate is integrated with said shoulder.

16. An integrated brake and chain disk assembly for a door operator as claimed in claim 15, wherein said block plate of said central disk and said push plate of said outer ring portion are coaxially arranged by the same radius.

17. An integrated brake and chain disk assembly as claimed in claim 16, wherein said block plate and said push plate respectively partially surround said first hub.

18. An integrated brake and chain disk assembly for a door operator as claimed in claim 13, wherein said brake device includes two torsion spring, and said either end of the torsion spring is a free end forming into a loop that is operatively engageable with the respective end of said block plate.

* * * * *